United States Patent Office 2,848,474
Patented Aug. 19, 1958

2,848,474
METHOD OF PRODUCING AND RECOVERING TRIMETHYL PHOSPHITE

William W. Marshall, Anniston, Ala., assignor to Monsanto Chemical Company, St. Louis, Mo., a corporation of Delaware No Drawing. Application October 19, 1953
Serial No. 387,060

2 Claims. (Cl. 260—461)

This invention relates to a method of producing alkyl, cycloalkyl and aralkyl phosphites and halophosphites and, more particularly, to a method of recovering these esters from mixtures containing same.

An object of the invention is to provide an economically and commercially practical method of producing and recovering phosphite esters defined by the following general formula:

$$P(OR)_3$$

wherein at least one R represents a member selected from the group consisting of alkyl, cycloalkyl and aralkyl radicals and the remaining ones are selected from the group consisting of said radicals, chlorine and bromine.

Another object of the invention is to provide an improved method of preparing alkyl phosphites and halophosphites, which eliminates the necessity of filtering the amine hydrohalide formed in the reaction and then liberating the amine by decomposing the salt in a separate operation.

A further object of the invention is to provide a novel method of producing alkyl esters of phosphorous acid in good yields and in a relatively pure form.

A still further object of the invention is to provide an improved method of recovering alkyl phosphites and halophosphites from mixtures containing same.

Other objects and advantages will appear hereinafter as the description of the invention proceeds.

It is known in the art that the esters of phosphorous acid may be prepared by reacting substantially one to three mols of an alcohol with about one mol of a trihalide selected from the group consisting of phosphorus trichloride and phosphorus tribromide. This reaction is carried out in the presence of an inert organic solvent and a tertiary amine which is effective to take up hydrogen halide formed in the reaction. This method is subject to a number of serious disadavntages which render it commercially unattractive. For example, this method requires the removal of the amine hydrohalide and this introduces substantial operational difficulties and product losses due to the large amount of amine hydrochloride formed per pound of product, the retention of the product in the filter cage and the hygroscopicity of the hydrohalide. Moreover, it necessitates the use of a separate operation for recovering the amine from the hydrohalide salt and this greatly increases the overall cost of manufacturing these products.

I have developed a method of producing and recovering alkyl, cycloalkyl and aralkyl phosphites and halophosphites which eliminates the difficulties and disadvantages of the known method described above. In accordance with this method, a phosphorous trihalide selected from the group consisting of $PCl_3$ and $PBr_3$ is reacted with an alcohol in the presence of an inert solvent and a tertiary amine to form the corresponding ester or ester halide in accordance with the following equation:

$$PX_3 + nHOR + nR_3'N \rightarrow P(OR)_nX_{3-n} + nR_3'N \cdot HX$$

wherein X is selected from the group consisting of chlorine and bromine, R is an alkyl, cycloalkyl or aralkyl radical, R' is a straight chain, branched chain or cyclic hydrocarbon radical and n is 1, 2 or 3.

The solution of ester or ester halide containing the hydrohalide salt is subjected to distillation in order to separate the ester or ester halide from the reaction mixture directly. After separation of the ester or ester halide, the residue may be treated with a dilute alkaline solution in an amount sufficient to liberate the tertiary amine and form the corresponding alkaline halide salt. This results in the production of a product which separates into two layers, namely, an aqueous layer containing the alkali metal halide and an organic layer containing the inert solvent and tertiary amine. This organic layer is separated from the aqueous layer and recycled to the reactor for reuse in the production of further quantities of the desired ester or ester halide.

The method of the instant invention is an improvement over the known one described earlier herein in that it avoids filtration of the amine hydrohalide salt and/or the separate operation of recovering the amine from the hydrohalide salt and also effects a substantial increase in yield of the desired product.

The following examples illustrate the improved process of this invention.

EXAMPLE I

Trimethyl phosphite

A mixture of about 68.1 grams (0.5 mol) of $PCl_3$ and 50 cc. of phenylcyclohexane was added with vigorous agitation to a mixture of 200 cc. of phenylcyclohexane, 48 grams (1.5 mols) of methanol and 363 grams (1.6 mols) of triamylamine. During the addition period of about 45 minutes, the reaction temperature was maintained below 0° C. by means of a Dry Ice-methanol bath. Upon completing the addition, the reaction mixture was maintained at about 0° C. for 1 hour, then heated to about 25° C. to about 30° C. and maintained at that temperature for a period of about ¾ hour. The product thus obtained was distilled under reduced pressure (2 mm. Hg) and about 61.8 grams of a crude distillate was recovered. This crude distillate was redistilled at atmospheric pressure and trimethyl phosphite boiling at 111–112° C. was obtained in a yield corresponding to 86% of theory, basis $PCl_3$.

EXAMPLE II

Trimethyl phosphite

The procedure disclosed in Example I was followed except that the following materials were used in the indicated proportions:

| | |
|---|---|
| $PCl_3$ | 550 grams (4 mols). |
| Methyl alcohol | 385 grams (12 mols). |
| Tributylamine | 2230 grams (12+ mols). |
| Partially hydrogenated hydrocarbon liquid mixture produced by the method of Jenkins Patent 2,364,719 | 1400 cc. |

Upon completing the reaction, the reaction mixture was subjected to distillation under reduced pressure and about 459.2 grams of crude distillate was obtained. This distillate was redistilled at atmospheric pressure and substantially pure trimethyl phosphite boiling at about 108–112° C. was obtained in a yield corresponding to about 84.2% of theory, basis $PCl_3$.

EXAMPLE III

Triethyl phosphite

About 68.7 grams (0.5 mol) of phosphorus trichloride dissolved in about 50 cc. of phenylcyclohexane was added slowly with agitation to a mixture of 150 cc. of phenylcyclohexane, 69 grams (1.5 mols) of ethyl alcohol and 363 grams (1.6 mols) of triamylamine. During the addition which occurred in a period of about 1 hour the reaction mixture was held at a temperature below 0° C. After the addition, the reaction mixture was maintained at 0° C. for 1 hour, then heated to room temperature and maintained at this temperature for ¾ hour. Upon completing this operation, the reaction mixture was subjected to distillation and 81 grams of a crude distillate was obtained. This product was redistilled and triethyl phosphite was recovered in a yield corresponding to about 73% of theory, basis $PCl_3$.

EXAMPLE IV

Triisopropyl phosphite

About 68.7 grams (0.5 mol) of $PCl_3$ dissolved in about 50 cc. of the partially hydrogenated hydrocarbon liquid mixture obtained by the method disclosed in Jenkins Patent 2,364,719 was added slowly with vigorous agitation to a mixture of about 150 cc. of the above partially hydrogenated product, about 341.5 grams (1.5 mols) of triamylamine and about 90 grams (1.5 mols) of isopropyl alcohol. The addition took place in a period of about 1 hour and during this time, the reaction temperature was maintained below 0° C. After the addition, the reaction mixture was held at 0° C. for 1 hour, then heated to room temperature and maintained at this temperature for a period of 45 minutes. The product thus obtained was subjected to distillation under reduced pressure and a crude distillate was recovered. This crude product was redistilled and triisopropyl phosphite was recovered as a distillate boiling at 72° C. at 17 mm. Hg.

EXAMPLE V

Diisopropyl chlorophosphite

The procedure described in Example IV was repeated using the following materials in the indicated proportions.

| | |
|---|---|
| $PCl_3$ | 68.7 grams (0.5 mol). |
| i-$C_3H_7OH$ | 60.0 grams (1 mol). |
| $(C_5H_{11})_3N$ | 227.5 grams (1 mol). |
| Partially hydrogenated liquid | 200 cc. | product obtained by the method disclosed in 2,364,719 to Jenkins.

The resulting reaction mixture was subjected to distillation under reduced pressure and about 91.1 grams of a crude product was obtained. This crude product was redistilled at atmospheric pressure and 71.9 grams of diisopropyl chlorophosphite was recovered in a yield of about 78% of theory, basis $PCl_3$.

EXAMPLE VI n-Butyl dichlorophosphite

A mixture of about 37.6 grams (0.5 mol) of n-butyl alcohol and about 113.8 grams (0.5 mol) of triamylamine was added slowly with vigorous agitation to a solution of about 68.7 grams (0.5 mol) of $PCl_3$ in 100 cc. of a partially hydrogenated hydrocarbon liquid mixture obtained by the method disclosed in Patent No. 2,364,719 to Russell L. Jenkins. The reaction temperature was maintained at about 0° C. during the addition. Upon completing this operation, the reaction mixture was heated to 30° C. for 20 minutes, and then the product was subjected to distillation under reduced pressure. The crude distillate thus obtained was redistilled and n-butyl dichlorophosphite was recovered as a distillate boiling at 63° C. at 18 mm. Hg.

The partially hydrogenated hydrocarbon liquid mixture used in the examples is characterized by having a specific gravity of about 1.004 at 25° C., a refractive index of about 1.5600 at 25° C. and a boiling range of about 340° C. to about 390° C. at atmospheric pressure.

In the production of alkyl, cycloalkyl and aralkyl phosphites and halophosphites in accordance with the instant invention, the reaction is carried out at a temperature ranging from about −30° C. up to that temperature at which substantial decomposition of the phosphorous acid ester or ester halide is avoided. More specifically, the reaction may be carried out at a temperature within the range of about −30° C. to about 70° C. and within these limits, a temperature of from −10° C. to 40° C. is preferred.

In carrying out these reactions, the reactants are employed in a molar ratio of alcohol to the phosphorus halide of from about 3:1 to about 1:1, the ratio depending upon the number of halogen atoms to be replaced. In the production of halophosphites, the alcohol and phosphorus halide are reacted together in substantially stoichiometric proportions, but in the case of neutral phosphites up to 10% molar excess or a larger excess of the alcohol may be employed. In general, it is desirable to use at least a slight excess of the alcohol in order to insure substantially complete conversion of the phosphorus halide to the desired ester or ester halide.

The reaction is carried out in the presence of an inert solvent, preferably an inert organic solvent which boils at atmospheric pressure at a temperature substantially above that of the ester or ester halide, that is, at a temperature of at least about 20° higher than the ester or ester halide at the above pressure. Illustrative examples of solvents which may be used in the practice of this invention are phenylcyclohexane, mononol naphthalene, polyamyl naphthalene, other alkylated naphthalenes, alkylated biphenyls and partially hydrogenated terphenyls. These solvents have the following combination of properties:

| Compound | Specific Gravity At 25° C. | Boiling Range, ° C. | Solubility in Water |
|---|---|---|---|
| Phenylcyclohexane | 0.93 | 239–241/760 mm. Hg | Insoluble. |
| Mononyl naphthalene | 0.93–0.94 | 320–350/760 mm. Hg | Do. |
| Mixture of amylnaphthalenes | 0.92–0.94 | 290–400/760 mm. Hg | Do. |
| Polyamyl naphthalene | 0.92–0.93 | 353–397/760 mm. Hg | Do. |
| Propylated biphenyl | 0.94 | 163–218/20 mm. Hg | Do. |
| Polyamyl biphenyl | 0.93–0.96 | 101–194/3–1.5 mm. Hg | Do. |
| Ethylated biphenyl | 0.97 | 145–213/17–16 mm. Hg | Do. |
| Monoamyl biphenyl | 0.97 | 314–338/760 mm. Hg | Do. |
| Diamyl biphenyl | 0.96 | 364–404/760 mm. Hg | Do. |
| Partially hydrogenated terphenyls | 1.004±0.003 | 340–396/760 mm. Hg | Do. |

It is, of course, to be understood that other equivalent high boiling inert solvents may be used.

As a modification of the method described herein, the reaction may be carried out in the presence of an inert low boiling solvent, after which a high boiling inert solvent may be added and the product fractionally distilled to separate the ester or ester halide. Illustrative examples of low boiling solvents which may be employed in the practice of this invention are ether, butane, hexane, benzene, toluene and xylene.

In the practice of the instant invention, the tertiary amines are employed in an amount at least substantially equivalent to the hydrogen halide liberated in the reaction, but slightly lower or substantially larger proportions may be used, if desired. Illustrative examples of tertiary amines which are suitable for reacting with the liberated hydrogen halide are triethylamine, tri-n-butylamine, triamylamine, trimethylamine, dimethylaniline, pyridine, 2-picoline, 3-picoline, quinoline, 2,6-lutidine, 2,4-lutidine, N-ethylmorpholine, N-butylmorpholine, etc. However, any tertiary amine which forms a hydrohalide salt that does not decompose appreciably at the temperatures required to distill the ester or ester halide from the high boiling solvent may be employed. More specifically, it is within the scope of the invention to use any tertiary amine which forms a hydrohalide salt that does not decompose appreciably at temperatures up to about 250° C.

The recovery of the desired product from the crude reaction mixture is effected by distillation at a temperature at least equivalent to the boiling point of the ester or ester halide at the operating pressure, but below that temperature at which substantial decomposition of this product takes place. More specifically, in the case of the lower alkyl esters or ester halides containing from 1 to 9 carbon atoms, the distillation is carried out preferably at a temperature in the range of about 50° C. to about 112° C.

The distillation pressure may fluctuate widely, but it is desirable to use pressures within the limits of about 2 to about 760 mm. of mercury. More specifically, in the case of the alkyl esters or ester halides referred to in the preceding paragraph, it is preferred to use a distillation pressure in the range of about 2 mm. Hg to about 20 mm. Hg.

The decomposition of the tertiary amine hydrohalide salt is accomplished by means of an aqueous solution of an alkaline material which will combine with the hydrogen halide and form a water soluble compound. Illustrative examples of suitable alkalis are the oxides, hydroxides, bicarbonates and carbonates of the alkali metals, particularly sodium, potassium and lithium; and alkaline earth compounds such as the oxides and hydroxides of calcium, barium, strontium and magnesium, and mixtures of two or more of these alone or in combination with the corresponding soluble halide salt.

In decomposing the tertiary amine hydrohalide salt, the aqueous alkaline solution is employed in an amount and in a concentration sufficient to substantially completely decompose the salt and at the same time provide a product that is sufficiently dilute to permit the reaction mixture to separate into an organic layer and an aqueous layer containing substantially all of the by-product alkaline halide dissolved therein. In general, it is convenient and practicable to use a 10% to a 25% alkaline solution, but higher or lower concentrations are also within the scope of the invention.

The treatment of the reaction mixture with a dilute alkaline solution results in the formation of a product which separates into two layers, namely, an aqueous layer containing the alkaline halide and an organic layer containing the inert solvent and tertiary amine. This organic layer is separated from the aqueous layer, dried and recycled to the reaction for reuse in the production of further quantities of the desired ester or ester halide. The ease with which the solvent and tertiary amine can be recovered from the crude reaction mixture allows the repeated use of these materials in the reaction. This not only adds greatly to the economics of the process but also makes possible continuous operation and thus renders the method attractive for use on a commercial scale.

As indicated earlier herein, the instant invention is directed to a method of producing and recovering alkyl, cycloalkyl and aralkyl phosphite esters and ester halides.

The esters may be homogeneous, that is, they may contain the same alkyl, cycloalkyl or aralkyl radicals or the esters may be of mixed type in which all three of the radicals may differ from each other or two of the radicals may be the same and the other different. Such esters may be made by employing one or more suitable alkyl alcohols such as methanol, ethanol, propanol, butanol and pentanol, etc.; cycloalkyl alcohols such as cyclohexanol, the methyl and dimethyl cyclohexanols and other cyclohexanol homologues, etc.; and aromatic alcohols such as benzyl alcohol, β-phenylethyl alcohol and ω-phenylpropyl alcohol, etc.

Moreover, the corresponding ester halides may be prepared by reacting from one to two mols of the above alcohols with one mol of a phosphorus trihalide selected from the group consisting of phosphorus trichloride and phosphorus tribromide.

What I claim is:

1. The method of producing trimethyl phosphite which comprises reacting in the presence of at least 3 mols of a tertiary amine and an inert solvent having a distillation temperature at atmospheric pressure of at least 20° above the boiling point of trimethyl phosphite substantially 3 mols of methanol and substantially 1 mol of phosphorus trichloride, to form a reaction product containing trimethyl phosphite, a tertiary amine hydrochloride, and said inert solvent, and subjecting said reaction product to distillation to directly separate said trimethyl phosphite.

2. The process of claim 1 wherein the inert solvent is phenylcyclohexane and wherein the tertiary amine is triamyl amine.

References Cited in the file of this patent

UNITED STATES PATENTS

| | | |
|---|---|---|
| 2,226,552 | Conary et al. | Dec. 31, 1940 |
| 2,408,744 | Engel | Oct. 8, 1946 |
| 2,495,958 | Craig et al. | Jan. 31, 1950 |